United States Patent [19]

Geiger

[11] Patent Number: 5,032,264
[45] Date of Patent: Jul. 16, 1991

[54] CATCH FLOW RESTRICTOR WITH OPENING CALIBRATED TO FLOW AND HEAD CHART

[75] Inventor: Robert A. Geiger, Bell River, Canada

[73] Assignee: Geiger Industries and Design Group Ltd., Windsor, Canada

[21] Appl. No.: 474,961

[22] Filed: Feb. 5, 1990

[30] Foreign Application Priority Data

Feb. 3, 1989 [CA] Canada .................................. 590,086

[51] Int. Cl.⁵ .............................................. F15D 1/00
[52] U.S. Cl. ...................................... 210/163; 138/45; 210/164; 404/4; 405/127
[58] Field of Search ....................... 29/890.09, 890.141; 52/11, 12; 138/44, 45; 210/163, 164, 166, 232, 477; 404/2, 4; 405/36, 127, 119

[56] References Cited

U.S. PATENT DOCUMENTS

| | | | |
|---|---|---|---|
| 1,363,792 | 12/1920 | Johnston | 210/164 |
| 2,432,082 | 12/1947 | Bilyeu | 138/45 |
| 3,469,698 | 9/1969 | Blendermann | 52/12 |
| 3,666,104 | 5/1972 | Aprill, Jr. et al. | 210/477 |
| 4,522,533 | 6/1985 | Campbell et al. | 138/44 |

FOREIGN PATENT DOCUMENTS 0236391  7/1911  Fed. Rep. of Germany ...... 210/163

Primary Examiner—Robert A. Dawson
Assistant Examiner—Joseph Drodge
Attorney, Agent, or Firm—Fleit, Jacobson, Cohn, Price, Holman & Stern

[57] ABSTRACT

A catch flow restrictor plate to control surcharging of water in a sewer system. The restrictor plate is to be placed in a catch basin and consists of a tray, which comprises an upper edge, downwardly sloping walls descending from the upper edge, the walls merging into a central portion. The central portion has a plurality of concentric calibration lines formed therein enabling to form an opening of a selected size by removing part of the central portion along a selected calibration line. A plurality of vertical fins are provided that radially extend from the central portion to the upper edge. The upper edge is arranged to hold the tray within a frame of the catch basin.

9 Claims, 2 Drawing Sheets

CATCH FLOW RESTRICTOR WITH OPENING CALIBRATED TO FLOW AND HEAD CHART

BACKGROUND OF INVENTION (a) Field of the Invention

This invention relates to a catch flow restrictor plate which can be used to control surcharging of sewage in a sewer system. More particularly, the present invention is concerned with a device that can be placed within the frame of a catch basin and just below the grating thereby causing a restriction of the amount of water entering the catch basin.

(b) Description of Prior Art

During any major storm a surcharged sewer may back up into foundation drains (or basement drains in combined sewer systems). The street or parking lot is used therefore, as a temporary reservoir and takes the pressure off an overtaxed sewer system.

U.S. Pat. Nos. 630,633 and 1,363,792 show configurations which could be used as some kind of flow restrictors. A component of plastic material that can be placed beneath a grate is described in U.S. Pat. No. 3,516,541. U.S. Pat No. 3,469,698 shows a weir to control the amount of water flow. Other Patents disclosing flow restrictors include U.S. Pat. Nos. 3,666,104; 4,107,929 and 4,683,685. However, none of the devices disclosed in the prior art teach the possibility of adapting the restrictor to a predetermined flow and to control suspensions found in the water being sent to the sewer system.

It is therefore an object of the present invention to provide a catch flow restrictor plate which allows easy access for storm water to enter the drainage system.

It is another object of the present invention to provide a device which restrict water flows and has a plate opening which is calibrated to specific communities flow charts, allowing a synchronization of water drainage and drainage system flow rate.

It is another object of the present invention to provide a flow restrictor in which obstruction control is provided by a plurality of fin design, preferably molded onto the restrictor plate surface, the fins suspending the debris to allow an unobstructed controlled flow.

SUMMARY OF INVENTION

These and other objects of the invention may be achieved by providing a catch flow restrictor plate to control surcharging of water in a sewer system. The restrictor plate is to be placed in a catch basin and consists of a tray, which comprises an upper edge, downwardly sloping walls descending from the upper edge, the walls merging into a central portion. The central portion has a plurality of concentric calibration lines formed therein enabling to form an opening of a selected size by removing part of the central portion along a selected calibration line. A plurality of vertical fins are provided that radially extend from the central portion to the upper edge, and means are associated with the upper edge to hold the tray within a frame of the catch basin.

In accordance with a preferred embodiment of the invention, the tray is rectangular and there are provided four trapezoidal downwardly sloping walls.

In accordance with another preferred embodiment of the invention, the central portion may be rectangular, the sides thereof merging with the trapezoidal downwardly sloping walls.

In accordance with yet another embodiment of the invention, there are provided four vertical fins which are disposed at the junctions between the four trapezoidal downwardly sloping walls.

In accordance with yet another embodiment of the invention, there are up to at least five concentric calibration lines which are all rectangular.

In accordance with yet another embodiment of the invention, the means associated with the edge to hold the tray within the frame consist of a peripheral flange which projects outwardly from the upper edge of the tray.

BRIEF DESCRIPTION OF DRAWINGS

The invention will be better understood from the description of a specific embodiment which is only given as illustration and in no way intends to limit the invention thereto. In the drawings which illustrate the invention.

DESCRIPTION OF PREFERRED EMBODIMENTS

Figure 2:
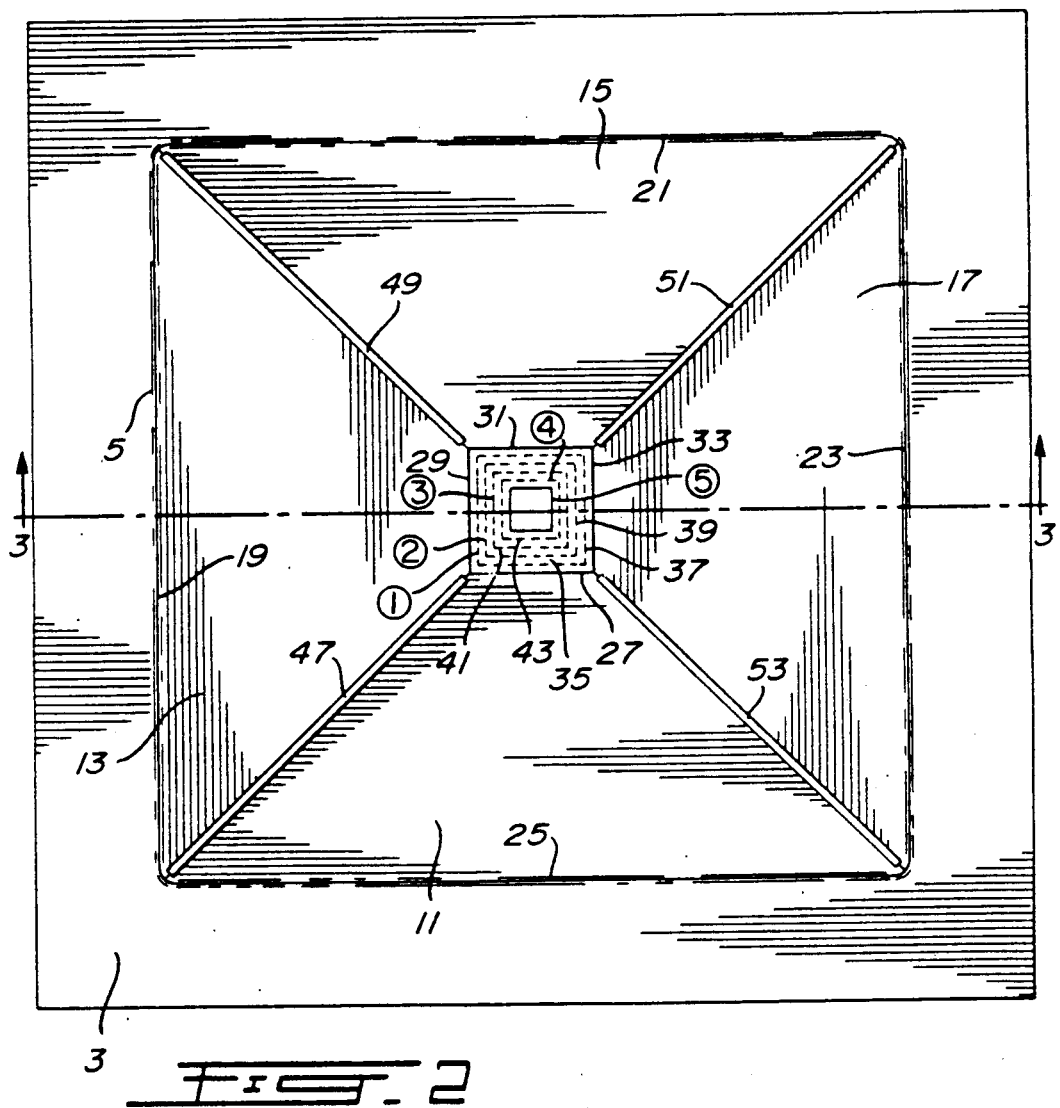
FIG. 2 is a top plan view of the flow restrictor plate illustrated in FIG. 1.
Figure 1:
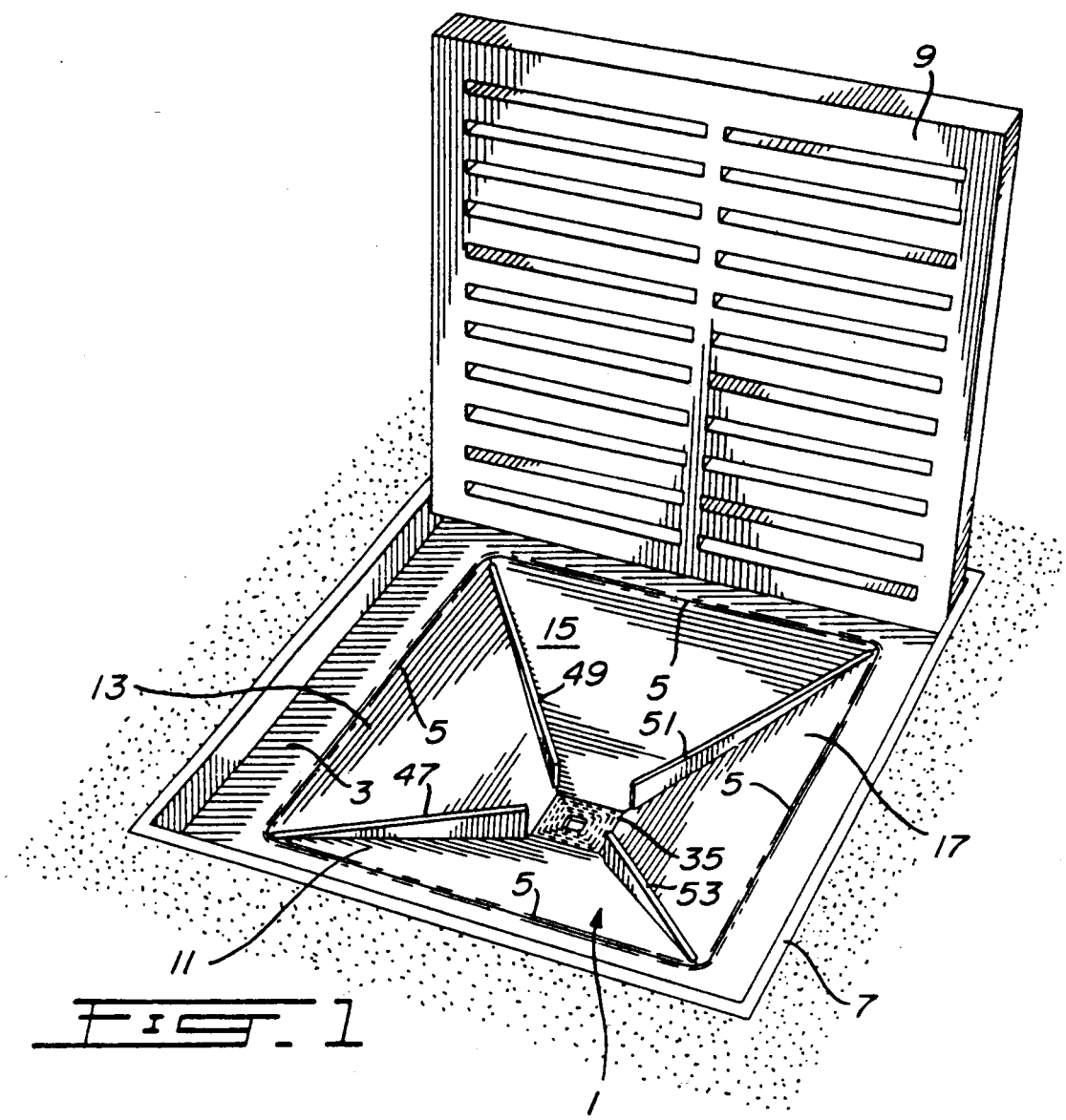
FIG. 1 is a perspective view of a catch flow restrictor plate according to the invention placed underneath the grating within the frame of a catch basin.
Figure 3:
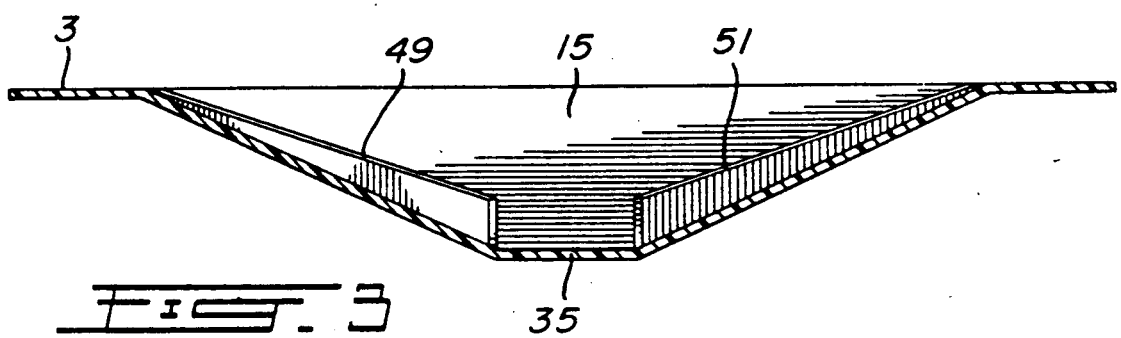
FIG. 3 is a cross-section taken along line 3—3 of FIG. 1.

With reference to the drawings, it will be seen that the catch flow restrictor plate according to the illustrated embodiment essentially consists of an injection molded rectangular tray 1. While in use, the tray 1 held by means of a peripheral flange 3 which projects outwardly from the four edges 5 of the rectangular tray 1, within the frame 7 of a catch basin (not shown in detail in the drawings). Furthermore, while in position within the frame 7, the tray 1 is just below the grating 9 of the catch basin.

The tray 1 is formed with four trapezoidal downwardly sloping walls 11, 13, 15, 17 which descend from the four edges 5, to form a hopper style device. With reference to the drawings, it will be seen that the longer sides 19, 21, 23, 25 of the trapezoidal walls 11, 13, 15, 17 merge with the four edges, 5 of the tray while the shorter sides 27, 29, 31, 33 merge with the four sides of a central flat portion 35 which will now be described.

This portion 35 constitutes a horizontal extension of the four trapezoidal walls 11, 13, 15 and 17 and is consequently rectangular. A series of five concentric rectangular calibration lines 37, 39, 41, 43 and 45 are formed on the upper surface of the central portion 35. These calibration lines are respectively marked ①, ②, ③, ④ and ⑤ and correspond to a flow and head chart which accompanies a specific restrictor plate. After mounting the restrictor plate within the frame 7 of a catch basin a sewer engineer simply has to cut or hammer off at the required calibration line that would give the proper flow rate of water entering the catch basin.

The tray 1 also comprises four vertical fins 47, 49, 51, 53 which are disposed at the junctions between the four trapezoidal downwardly sloping walls 11, 13, 15, 17. The fins will serve to keep particles in suspension while water flows down the catch basin, thereby allowing an unobstructed controlled, flow of overflow liquid towards the catch basin.

The catch flow restrictor plate is preferably manufactured by injection molding, but it is understood that it can be produced by any other method known to those skilled in the art without departing from the spirit of the invention.

I claim:

1. A catch flow restrictor plate sized, constructed and arranged to control surcharging of water in a sewer system and for placement in a foundation or street level catch basin, said restrictor plate consisting of a tray, said tray comprising an upper edge, downwardly sloping walls descending from said edge, said walls merging into a central lowermost portion, said central portion having a plurality of concentric calibration lines formed therein at locations determined by a flow and head chart and serving as a means for providing an opening of a selected size by determining a portion of said central portion to be removed along a selected calibrated line, a plurality of vertical fins extending radially from said central portion to said upper edge, and means adjacent to said edge to hold said tray within a frame of said catch basin.

2. A catch flow restrictor plate according to claim 1, wherein said tray is rectangular, and said walls comprise four trapezoidal downwardly sloping walls.

3. A catch flow restrictor plate according to claim 2, wherein said central portion is rectangular, the side thereof merging with lower sides of said trapezoidal downwardly sloping walls.

4. A catch flow restrictor plate according to claim 3, wherein said fins comprise four vertical fins which are disposed at the junctions between said trapezoidal downwardly sloping walls.

5. A catch flow restrictor plate according to claim 4, wherein said calibration lines are rectangular.

6. A catch flow restrictor plate according to claim 5, which comprises up to at least five of said concentric rectangular calibration lines.

7. A catch flow restrictor plate according to claim 6, wherein said means adjacent to said edge comprise a peripheral flange outwardly projecting from said edge.

8. A catch flow restrictor plate according to claim 7, which is injection molded.

9. A catch flow restrictor plate sized, constructed and arranged to control surcharging of water in a sewer system and for placement in a foundation or street level catch basin, said restrictor plate consisting of an injection molded rectangular tray, said tray comprising an upper rectangular edge, a peripheral flange outwardly projecting from said rectangular edge and constructed to hold said tray within a frame of said catch basin, four trapezoidal downwardly sloping walls descending from said rectangular edge, said trapezoidal downwardly sloping walls having longer sides merging with said rectangular edge and shorter sides merging with all sides of a central rectangular portion, four vertical fins being disposed at junctions between said trapezoidal downwardly sloping walls, said central rectangular portion having a plurality of concentric rectangular calibration lines formed therein at locations determined by a flow and head chart and serving as a means for providing an opening of a selected size by determining a portion of said central portion to be removed along a selected calibration line.

* * * * *